(12) United States Patent
Hoy (10) Patent No.: US 12,130,631 B2
(45) Date of Patent: Oct. 29, 2024

(54) METHODS AND SYSTEMS OF NAVIGATIONAL STATE DETECTION FOR UNOBSERVABLE REGIONS

(71) Applicant: ZEBRA TECHNOLOGIES CORPORATION, Lincolnshire, IL (US)

(72) Inventor: Aaron Hoy, San Jose, CA (US)

(73) Assignee: Zebra Technologies Corporation, Lincolnshire, IL (US)

( * ) Notice: Subject to any disclaimer, the term of this patent is extended or adjusted under 35 U.S.C. 154(b) by 274 days.

(21) Appl. No.: 17/714,248

(22) Filed: Apr. 6, 2022

(65) Prior Publication Data
US 2023/0324919 A1    Oct. 12, 2023

(51) Int. Cl.
*G05D 1/00*    (2024.01)

(52) U.S. Cl.
CPC ......... *G05D 1/0238* (2013.01); *G05D 1/0088* (2013.01); *G05D 1/0219* (2013.01); *G05D 1/0274* (2013.01)

(58) Field of Classification Search
CPC .................................................. G05D 1/0238
See application file for complete search history.

(56) References Cited

U.S. PATENT DOCUMENTS

| | | | |
|---|---|---|---|
| 7,145,478 B2 | 12/2006 | Goncalves et al. | |
| 10,105,186 B2* | 10/2018 | Cheng | A61B 34/20 |
| 11,249,479 B2* | 2/2022 | Thakur | G07C 5/0808 |
| 2016/0000516 A1 | 1/2016 | Cheng et al. | |
| 2022/0066456 A1 | 3/2022 | Ebrahimi Afrouzi et al. | |
| 2023/0324919 A1* | 10/2023 | Hoy | G05D 1/0248 |

OTHER PUBLICATIONS

International Search Report and Written Opinion for International Application No. PCT/US2023/017250 mailed on Jul. 3, 2023.

* cited by examiner

*Primary Examiner* — Michael A Berns (57) ABSTRACT

A method includes: maintaining a map of occupied regions of a facility; controlling a sensor of a mobile apparatus to capture sensor data within a field of view (FOV); based on a current location of the mobile apparatus in the facility, identifying an unobservable occupied region, located outside the FOV, in the map; selecting, from the map, a first reference occupied region having a first reference identifier, and a second reference occupied region having a second reference identifier; generating a first connection score associating the unobservable occupied region with the first reference occupied region, and a second connection score associating the unobservable occupied region with the second reference occupied region; selecting a handling operation for the unobservable occupied region, based on the first and second connection scores; updating the map according to the selected handling operation; and controlling a locomotive assembly of the mobile apparatus according to the updated map.

24 Claims, 9 Drawing Sheets

METHODS AND SYSTEMS OF NAVIGATIONAL STATE DETECTION FOR UNOBSERVABLE REGIONS

BACKGROUND

An autonomous or semi-autonomous mobile apparatus may include navigational sensors such as depth sensors or the like, to detect obstacles in the vicinity of the apparatus for navigational purposes. Such sensors may have limited fields of view, such that as the apparatus travels, areas in which obstacles were previously observed fall outside the fields of view of the sensors. The mobile apparatus' inability to observe those areas results in ambiguity as to whether the previously observed obstacles are still present, which can lead to incorrect and/or inefficient navigation of the apparatus.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Examples disclosed herein are directed to a method, comprising: maintaining a map of occupied regions of a facility; controlling a navigational sensor of a mobile apparatus to capture sensor data within a sensor field of view (FOV); based on a current location of the mobile apparatus in the facility, identifying an unobservable occupied region, located outside the sensor FOV, in the map; selecting, from the map, a first reference occupied region having a first reference identifier, and a second reference occupied region having a second reference identifier; generating a first connection score associating the unobservable occupied region with the first reference occupied region, and a second connection score associating the unobservable occupied region with the second reference occupied region; selecting a handling operation for the unobservable occupied region, based on the first and second connection scores; updating the map according to the selected handling operation; and controlling a locomotive assembly of the mobile apparatus according to the updated map.

Additional examples disclosed herein are directed to a computing device, comprising: a sensor having a sensor field of view (FOV); and a processor configured to: maintain a map of occupied regions of a facility; control the sensor to capture sensor data within a sensor field of view (FOV); based on a current location of a mobile apparatus in the facility, identify an unobservable occupied region, located outside the sensor FOV, in the map; select, from the map, a first reference occupied region having a first reference identifier, and a second reference occupied region having a second reference identifier; generate a first connection score associating the unobservable occupied region with the first reference occupied region, and a second connection score associating the unobservable occupied region with the second reference occupied region; select a handling operation for the unobservable occupied region, based on the first and second connection scores; update the map according to the selected handling operation; and control a locomotive assembly of the mobile apparatus according to the updated map.

Figure 1:
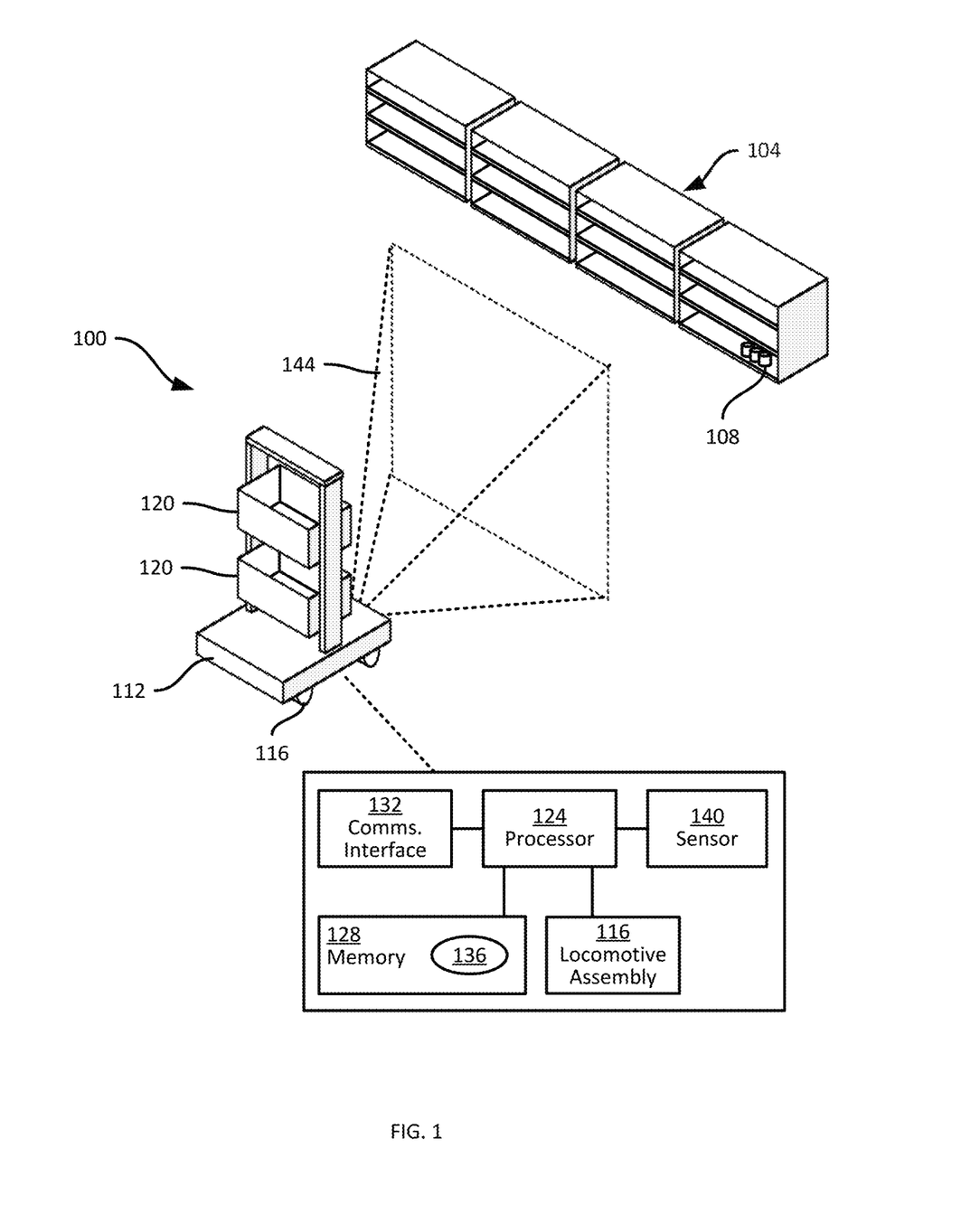
FIG. 1 is a diagram illustrating a mobile apparatus and a portion of an environment in which the apparatus is deployed for navigation.

FIG. 1 illustrates an autonomous or semi-autonomous mobile apparatus 100, also referred to herein simply as the apparatus 100. The apparatus 100 can be deployed in any of a wide variety of environments, such as an item handling facility (e.g., a warehouse, retail facility, or the like). The facility may, for example, include a plurality of support structures, such as shelf modules 104, supporting items 108.

As will be apparent, the facility in which the apparatus 100 is deployed can take various other forms, such as manufacturing facilities, outdoor operating environments, and the like. The apparatus 100 includes certain components, and implements certain functionality, that enable the apparatus 100 to navigate the facility in which the apparatus 100 is deployed, at least partially autonomously. For example, the apparatus 100 can be configured to navigate among aisles formed by the shelf modules 104, to collect images or other data corresponding to the items 108, to receive and transport the items 108 for order fulfillment operations, and the like. The apparatus 100 may therefore also be referred to as a transporter 100.

The apparatus 100 includes a chassis 112 supporting various other components of the apparatus 100. In particular, the chassis 112 supports a locomotive assembly 116, such as one or more electric motors or the like driving a set of wheels, tracks, or the like. The chassis 112 supports, in the illustrated example, one or more receptacles 120, such as bins or totes, e.g., for receiving and transporting items 108 placed therein by workers in the facility. In other examples, depending on the nature of deployment of the apparatus 100 (e.g., whether the apparatus 100 is deployed to transport items 108), the receptacles 120 can be omitted.

The components supported by the chassis 112 also include a processor 124, e.g., in the form of one or more central processing units (CPU), graphics processing units (GPU), or dedicated hardware controllers such as application-specific integrated circuits (ASICs). The processor 124 is communicatively coupled with a memory 128, e.g., a suitable combination of volatile and non-volatile memory elements. The processor 124 can also be coupled with a communications interface 132, such as a wireless transceiver enabling the apparatus 100 to communicate with other computing devices via suitable network infrastructure. In other examples, however, the communications interface 132 can be omitted.

The memory 128 stores various data used for autonomous or semi-autonomous navigation by the apparatus 100, including an application 136 executable by the processor 124 to implement navigational functions. In some examples, the above functions can be implemented via multiple distinct applications stored in the memory 128. In further examples, some or all such functions can be implemented by a distinct computing device, remote from the apparatus 100. The results of such remote navigational functions can be communicated to the apparatus 100 via the communications interface 132. The processor 124, as configured via execution of the application 136, can also be referred to as a navigational controller. As will be apparent to those skilled in the art, the navigational controller can therefore also be implemented by a distinct computing device as noted above.

The chassis 112 also supports a navigational sensor 140, such as one or more cameras and/or depth sensors (e.g., lidars, depth cameras, or the like) communicatively coupled with the processor 124. The sensor 140, in the illustrated example, is configured to capture sensor data such as depth measurements depicting at least a portion of the physical environment of the apparatus 100. In particular, the sensor data represents an area encompassed by a field of view (FOV) 144 of the sensor 140. In some examples, the FOV 144 can be defined by individual FOVs of multiple sensors. For example, the apparatus 100 can include a depth camera with a substantially pyramidal FOV, such as that shown in FIG. 1, as well as lidar with a substantially planar FOV. As seen in FIG. 1, the sensor 140 is disposed on a base of the chassis. In other examples, the sensor 140 (or any subset of sensors, when more than one sensor is implemented) can be placed in other suitable locations on the chassis 112, including on the rack supporting the receptacles 120.

As will be discussed below in greater detail, the processor 124 is configured, via execution of the application 136, to process the sensor data captured by the sensor 140 to detect obstacles in the vicinity of the apparatus 100, for use in navigating within the facility, e.g., to travel to target locations while avoiding such obstacles.

Figure 2:
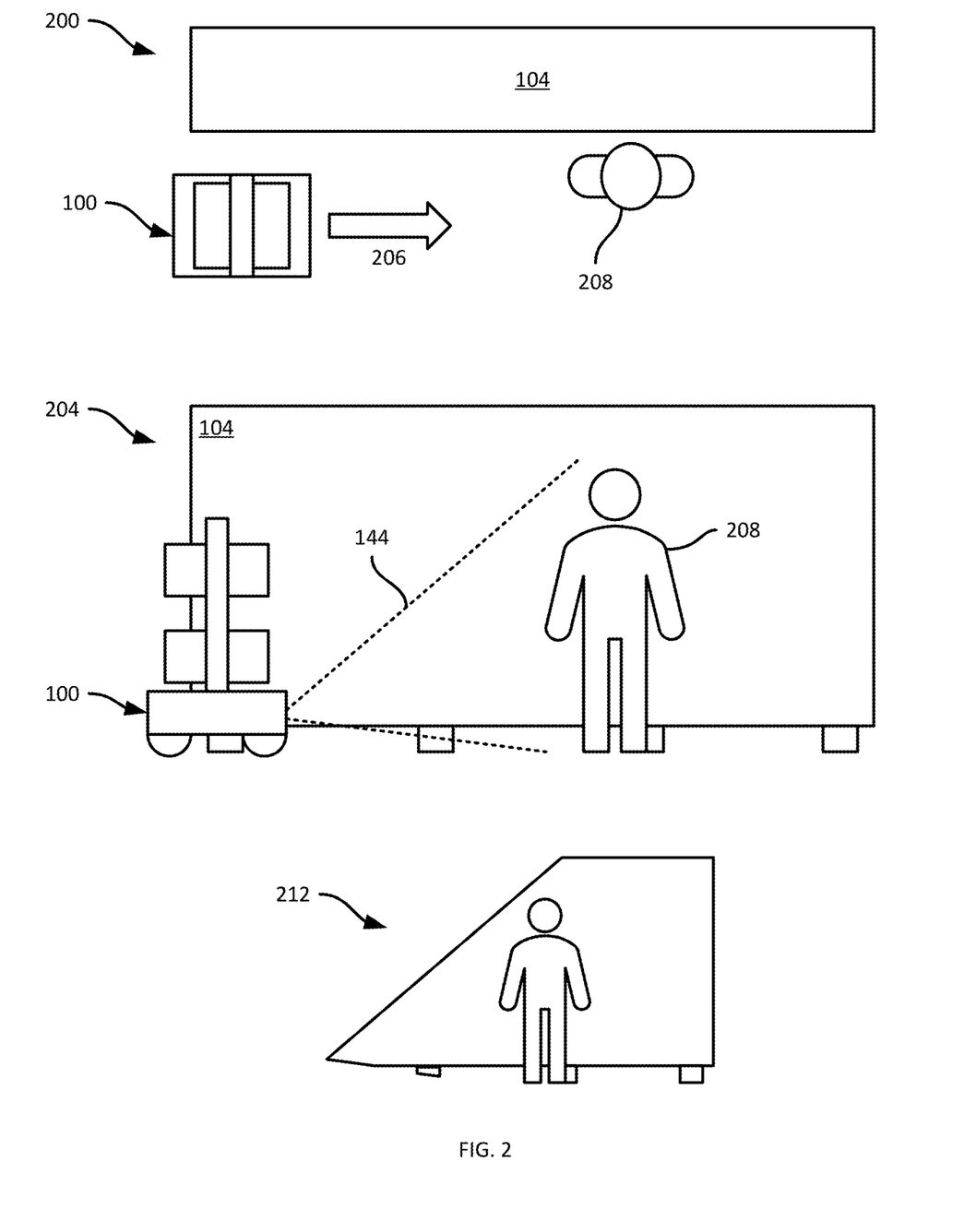
FIG. 2 is a diagram illustrating the detection of obstacles by the apparatus of FIG. 1.

For example, turning to FIG. 2, an overhead view 200 and a side view 204 illustrate the apparatus 100 travelling in a direction 206 along a shelf module 104 or set of shelf modules 104, adjacent to which a person 208 is standing. As seen in the side view 204, the field of view 144 encompasses a portion of the shelf module 104, as well as the person 208. Sensor data 212 (e.g., a frame of depth measurements) captured by the sensor 140 therefore depicts the entire person 208. As will be apparent, certain portions of the person 208 may not be visible to the sensor 140 if obscured by other portions of the person 208, but the entire person 208 is shown for simplicity of illustration. Having captured the sensor data 212, the processor 124 can detect obstacles such as the shelf module 104 and the person 208 therein, and generate navigational commands for controlling the locomotive assembly 116 to continue travelling towards a target location while avoiding detected obstacles.

The sensor data 212, or a processed form thereof, can be stored at the apparatus 100 for use in the above-mentioned navigational control operations, and may be referred to as an obstacle map. In some implementations, the obstacle map takes the form of an occupancy grid, such as a grid of three-dimensional voxels (e.g., 1 cm cubed, although a wide variety of other resolutions are also contemplated). Each voxel can be marked as occupied, or unoccupied, and the apparatus 100 is configured to select travel paths and/or other navigational actions to avoid contact with occupied voxels.

Further sets of sensor data, e.g., further frames of depth measurements, can be captured periodically at a variety of frequencies. For example, the processor 124 can be configured to control the sensor 140 to capture updated sensor data several times per second. As will be apparent to those skilled in the art, movement of either or both of the apparatus 100 and the person 208 (or any other dynamic, i.e., movable, obstacle in the facility, including shopping carts, boxes, and the like) alters the position of the FOV 144 relative to such obstacles. As a result, regions of the obstacle map generated from one or more preceding frames of sensor data may later fall outside the FOV 144. That is, those regions may become unobservable in subsequent frames of sensor data.

Figure 3:
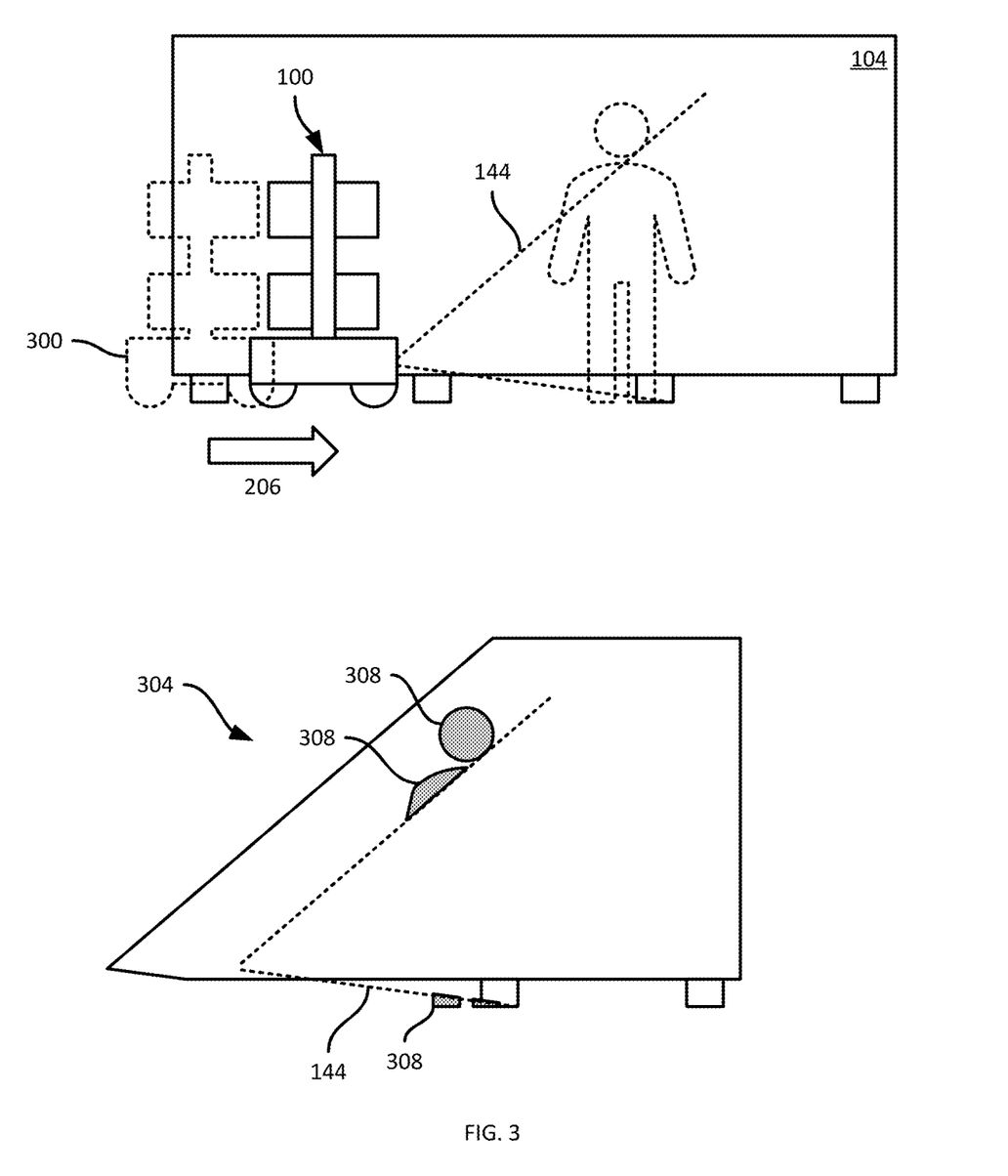
FIG. 3 is an diagram illustrating unobservable occupied regions resulting from movement of the apparatus and/or other obstacles during navigation.

Turning to FIG. 3, for example, the apparatus 100 is shown having travelled some distance along the shelf module 104 in the direction 206 from an earlier position 300 (corresponding to the position shown in FIG. 2). In addition, the person 208 shown in FIG. 2 has departed from the position shown in FIG. 2 (illustrated in dashed lines in FIG. 3), and the FOV 144 therefore encompasses only a portion of the shelf module 104. In generating an updated obstacle map 304, therefore, the processor 124 clears some regions of the map 304 that previously depicted the person 208. Those regions can be cleared because they are observable, falling within the FOV 144, and are plainly no longer occupied. However, certain portions of the person 208 as previously observed fall outside the FOV 144. Those portions were marked as occupied regions of the map from the sensor data 212, but are no longer observable. The map 304 therefore includes unobservable occupied regions 308 whose occupancy status cannot be updated by direct observation. Unobservable occupied regions may therefore, as shown in FIG. 3, be adjacent to the chassis 112 and of navigational significance. The volume adjacent to the chassis 112 that is unobservable may depend on the number of sensors, their locations of deployment on the chassis 112, and the angle and direction of their respective FOVs.

In some systems, the apparatus 100 may handle such unobservable occupied regions by assuming that they remain occupied. As shown in FIG. 3, however, that assumption is incorrect in some scenarios, which can lead to inefficient navigation by the apparatus 100, e.g., in the form of waiting for a non-existent obstacle to clear, or generating a new travel path around the non-existent obstacle. In other systems, the apparatus 100 may instead simply clear unobservable occupied regions. That approach, however, may lead to collisions when those regions are in fact still occupied.

In further systems, the navigational challenges introduced by unobservable occupied regions, as outlined above, may be addressed by assessing connection strengths between the unobservable occupied regions and observable occupied regions. Such assessments can be based, for example, on proximity and/or the presence or absence of unoccupied space between the unobservable and observable regions. Unobservable occupied regions that are close to observed occupied regions and are separated from the observed occupied regions by little or no unoccupied space may therefore be assumed to still be occupied. The above approach, however, may lead to inaccurate retention of unobservable occupied regions such as the regions 308, because of the close proximity between the person 208 and the shelf module 104 (as see in the overhead view 200 of FIG. 2).

The apparatus 100 therefore implements additional functionality via execution of the application 136, as described below in greater detail, to generate distinct connectivity assessments between unobservable occupied regions and multiple distinct categories of reference occupied regions (e.g., observed obstacles, and/or predefined static obstacles such as the shelf modules 104). The apparatus 100 is therefore enabled to detect false connections such as that between the person 208 and the shelf module 104 mentioned above, resulting in improved accuracy in the handling of unobserved occupied regions.

Figure 4:
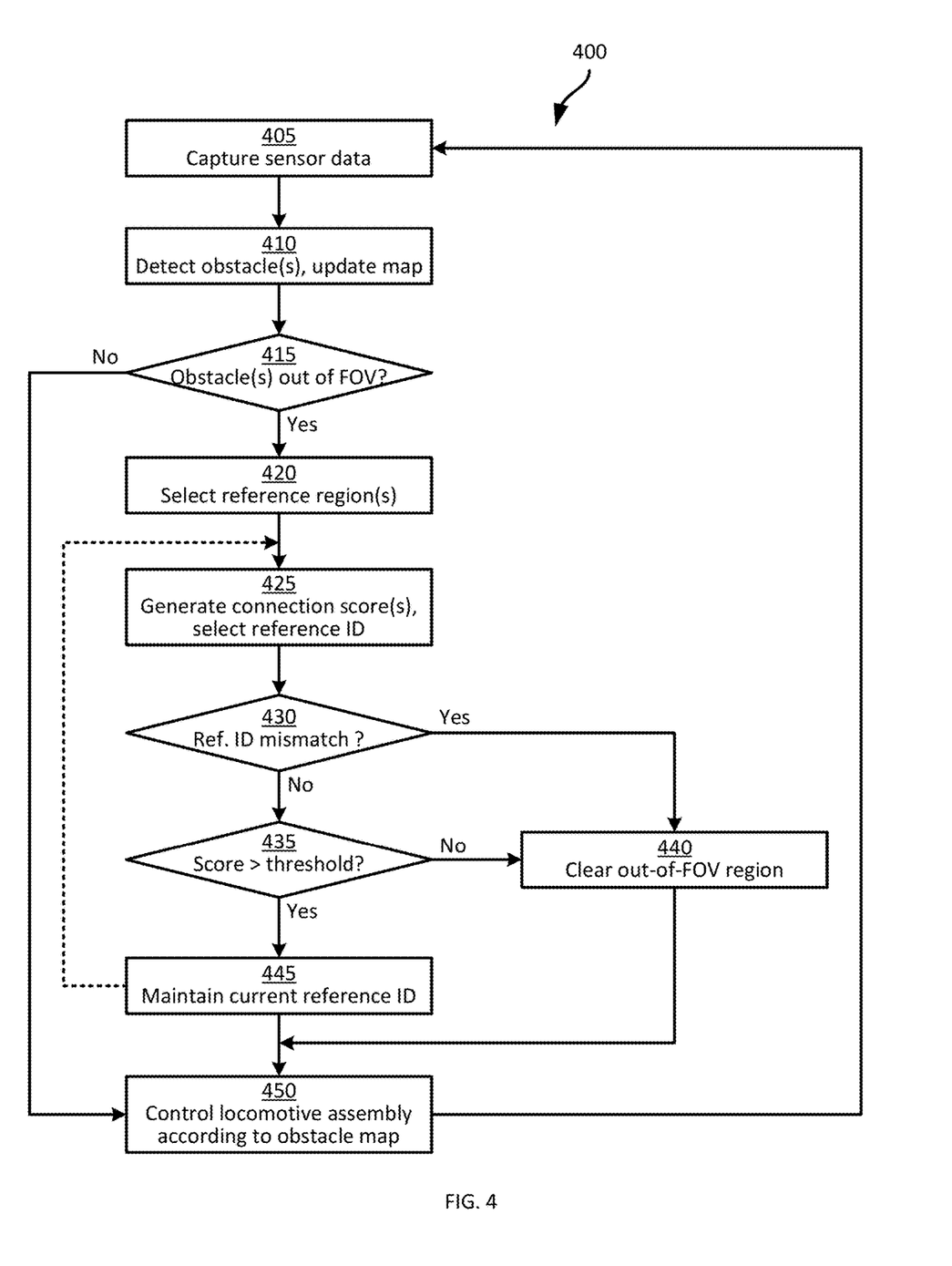
FIG. 4 is a flowchart of a method of navigational state detection for unobservable occupied regions.

Turning to FIG. 4, a method 400 of navigational state detection for unobservable regions is illustrated. The method 400 will be described below in conjunction with its performance by the apparatus 100, in particular via execution of the application 136 by the processor 124 and resulting control of other components of the apparatus 100 by the processor 124. As will be apparent, the method 400 can also be performed by other apparatuses, and in some examples can be performed by a computing device physically distinct from the apparatus 100, as noted earlier.

At block 405, the processor 124 is configured to control the sensor 140 to capture sensor data. In the present example, the sensor 140 is assumed to be a depth camera, and at block 405 the sensor 140 is therefore controlled to capture one frame of depth measurements (with or without color data). In other examples, as noted earlier, the apparatus 100 can include multiple sensors, such as additional depth cameras, lidars, and the like. Such additional sensors can also be controlled to capture sensor data at block 405.

At block 410, having captured the sensor data at block 405, the processor 124 is configured to detect obstacles in the sensor data, and to update an obstacle map maintained in the memory 128 to represent such obstacles. As will be apparent in the discussion below, the updated map produced at block 410 may not be a fully updated version of the map upon which navigational decisions are taken. That is, further updates to the map may be made prior to use for navigation.

Figure 5:
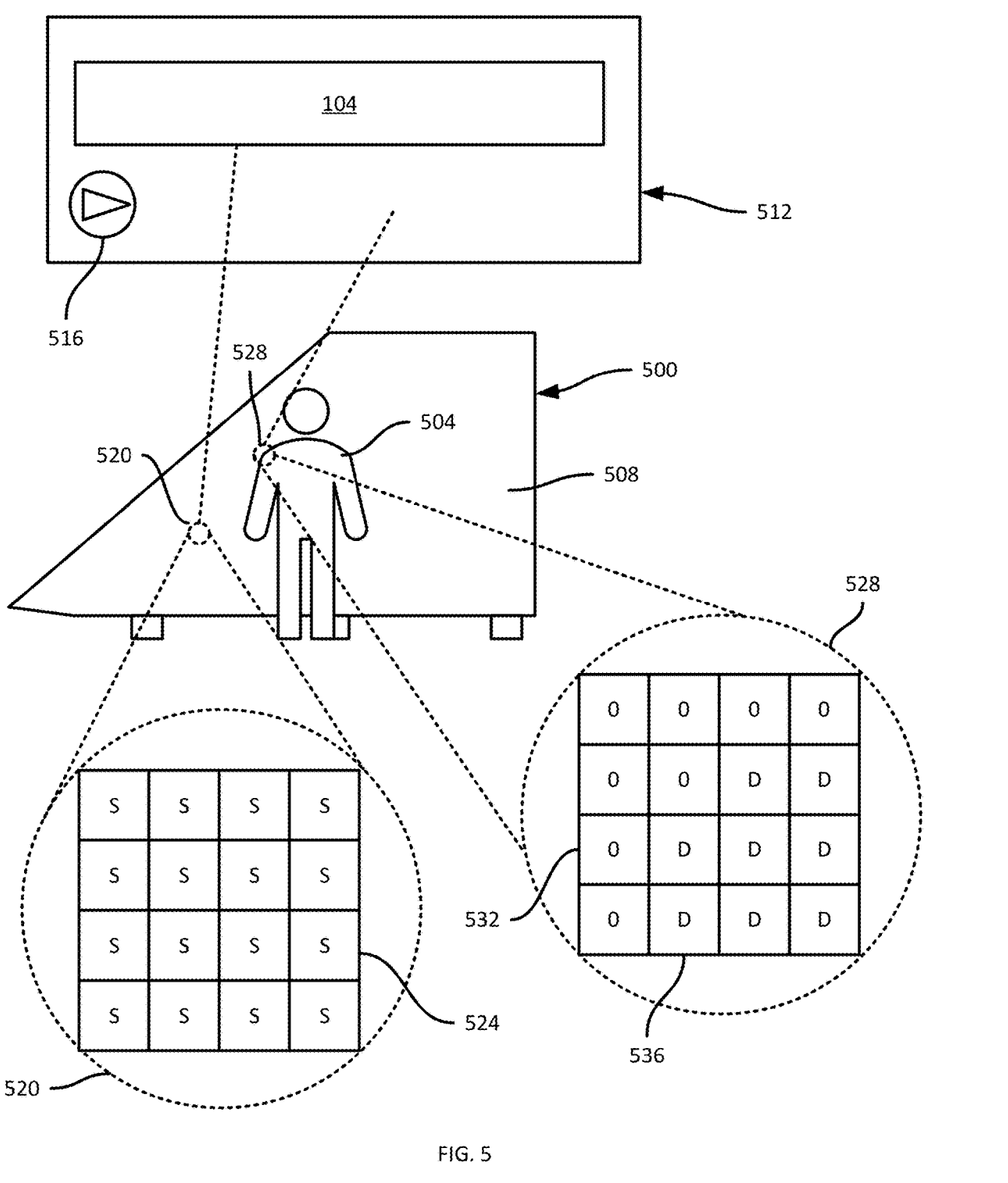
FIG. 5 is a diagram illustrating an example performance of blocks 405 and 410 of the method of FIG. 4.

FIG. 5 illustrates an example obstacle map 500 generated from the sensor data 212 shown in FIG. 2. That is, in an example performance of block 405 when the apparatus 100 and person 208 are positioned as shown in FIG. 2, the processor 124 obtains the sensor data 212 and processes the sensor data 212 to identify occupied regions 504, corresponding to the person 208, and occupied regions 508, corresponding to the shelf module 104. The nature of the occupied regions 504 and 508 varies according to implementation. For example, in some implementations the processor 124 can execute object-segmentation operations to identify the shelf module 104 and the person 208 as objects distinct from one another and having separate object identifiers. In other examples, as shown in FIG. 5, the processor 124 instead implements the map 500 as an occupancy grid, e.g., a three-dimensional grid of voxels registered to a coordinate system in which the apparatus 100 also tracks its own location. Objects need not be segmented or otherwise recognized in such an implementation. Instead, each voxel is assigned an occupied or unoccupied (empty) state, based on whether the sensor data 212 indicates the presence of an obstruction in that voxel.

In addition, the processor 124 is configured to label each occupied region (e.g., each occupied voxel observed in the sensor data 212) with one of a plurality of reference identifiers. The reference identifiers correspond to distinct categories of obstacle. In some examples, such as those in which object segmentation is performed, each reference identifier can correspond to a single specific obstacle (such as the person 208). That is, each obstacle can be assigned a unique identifier, and each category therefore contain only one obstacle. In other examples, each reference identifier can be assigned to more than one physical object, according to certain characteristics of the object detectable from the sensor data 212.

Specifically, in the present example, the reference identifiers include a first reference identifier corresponding to static obstacles, and a second reference identifier corresponding to dynamic obstacles. A static obstacle is an obstacle represented in a predefined map of the facility, e.g., stored in the memory 128 when the apparatus 100 is deployed. The predefined map may indicate the positions of fixed, or infrequently reconfigured, structures in the facility such as the shelf modules 104, walls, doorways, and the like. A dynamic obstacle is any obstacle not represented in the predefined map. In this example, the memory 128 stores a predefined map 512 of the facility, on which a current location 516 of the apparatus 100 is shown. To label an occupied region in the map 500, the processor 124 can determine whether the corresponding region in the map 512 is occupied. When the corresponding region in the map 512 is occupied, the occupied region in the map 500 is marked as a static obstacle. Otherwise, the occupied region in the map 500 is marked as a dynamic obstacle.

In the illustrated example, therefore, occupied regions in an area 520, shown as voxels 524, are labelled with a reference identifier "S", indicating that those voxels correspond to a static obstacle in the predefined map 512. As indicated by the dashed line connecting the area 520 with the map 512, the area 520 coincides with the location of a part of the shelf module 104. Occupied regions in an area 528, however, corresponding to an area of the map 512 that contains empty space. Therefore, certain voxels 532 in the area 528 can be marked with an indication that they contain empty space (e.g., a value of zero, or the like). Other voxels 536 in the area 528, corresponding to a shoulder of the person 208 in this example, are labelled with a reference identifier "D", indicating that those voxels correspond to a dynamic obstacle.

Returning to FIG. 4, at block 415 the processor 124 is configured to determine whether the map from block 410 contains unobservable occupied regions. Unobservable occupied regions are those previously marked as occupied (and therefore associated with a reference identifier as set out above), but that fall outside the FOV 144 of the current sensor data from block 405. A region can fall outside the FOV 144 by lying outside the maximum extents of the FOV 144 as illustrated in dashed lines, e.g., in FIG. 3, or by lying within those extents but being occluded by another object. The position of the FOV 144, and therefore the distinction between observable and unobservable regions such as the voxels mentioned above, is made by the apparatus 100 based on the current location of the apparatus 100 and calibration parameters corresponding to the sensor 140 maintained in the memory 128. The calibration parameters can include, for example, camera intrinsic and/or extrinsic parameters corresponding to a depth camera.

In the present example, it is assumed that the map 500 shown in FIG. 5 results from an initial performance of block 405, and that there are therefore no unobservable occupied regions. The determination at block 415 is therefore negative. In the event of a negative determination at block 415, the processor 124 proceeds to block 450. At block 450, the processor 124 is configured to control the locomotive assembly 116 to navigate the apparatus 100 within the facility according to the obstacle map. Thus, in the present example, the processor 124 may determine that the person 208 is sufficiently distant from the apparatus 100 that forward motion in the direction 206 can continue.

Figure 6:
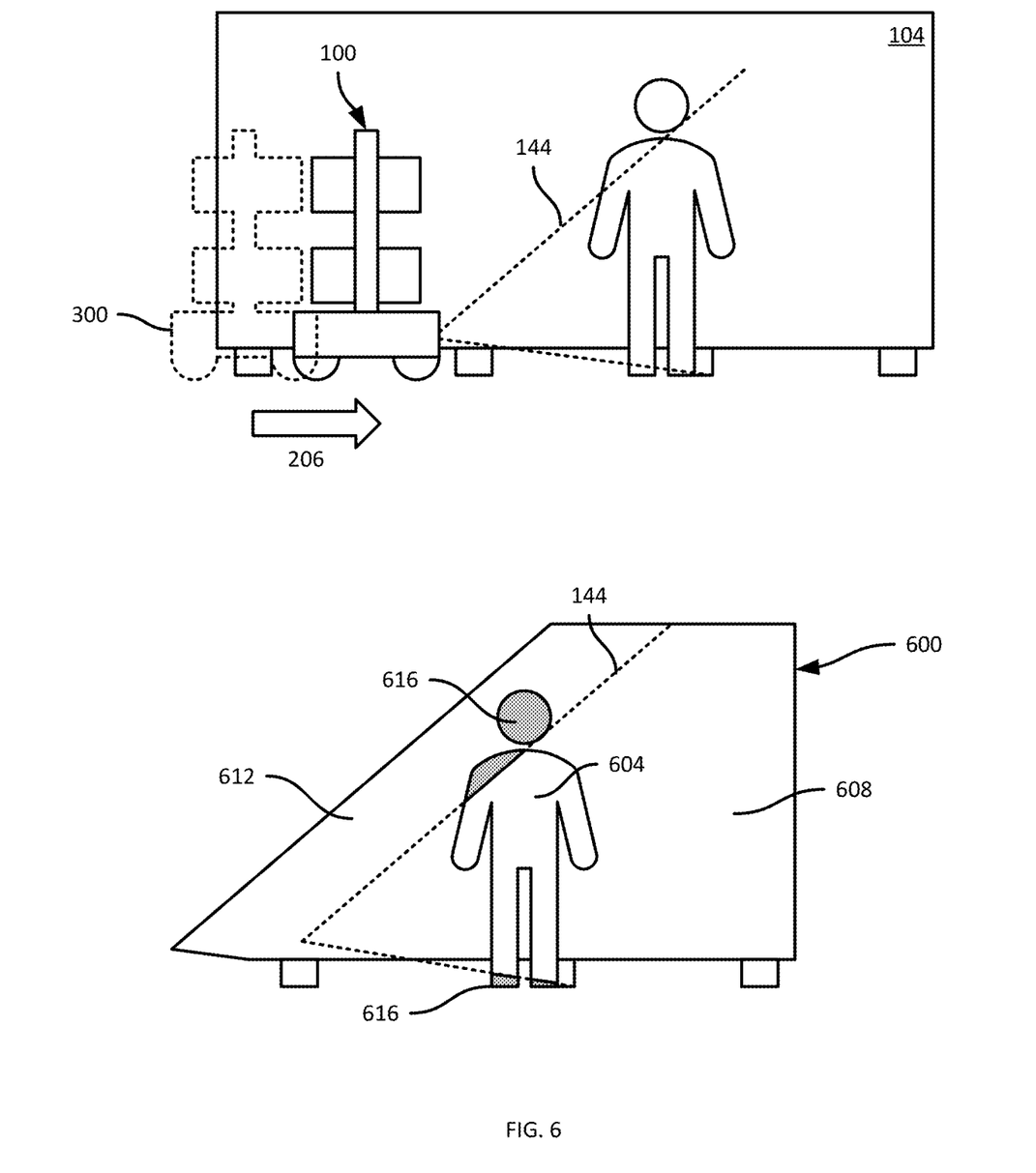
FIG. 6 is a diagram illustrating a further example performance of blocks 405 and 410 of the method of FIG. 4.

At a second performance of block 405, referring to FIG. 6, the apparatus 100 has travelled in the direction 206, towards the person 208 from the position 300. The person 208, however, in contrast with the scenario shown in FIG. 3, has remained in the same location, and the apparatus 100 has therefore approached the person 208 such that some of the person 208 is no longer observable within the FOV 144.

At block 410, the processor 124 is configured to update the map 500 based on sensor data captured from the location of the apparatus 100 shown in FIG. 6. The processor 124 therefore generates an updated map 600 in which region(s) 604 corresponding to the observable portion of the person 208 are marked with the reference identifier for dynamic obstacles. Further, regions 608 corresponding to an observable portion of the shelf module 104 are marked with the reference identifier for static obstacles. Regions 612 corresponding to a now-unobservable portion of the shelf module 104, in this example, remain marked with the reference identifier for static obstacles, and need not be processed as unobservable occupied areas according to the mechanisms set out below, because they align with the predefined map 512.

Further regions 616 correspond to portions of the person 208 that are now unobservable. Further, the regions 616 are not shown as occupied in the predefined map 512. The current state of the regions 616 is therefore ambiguous. The presence of the regions 616 in the map 600 leads to an affirmative determination at block 415, and the processor 124 therefore proceeds to block 420.

At block 420, the processor 124 is configured to select one or more reference regions. In the present example, in which the maps 500, 600 are voxel-based occupancy grids, the processor 124 is configured to select a set of reference voxels from the map 600. The reference regions are observed (i.e., within the FOV 144 for the current performance of block 405) and/or correspond to static obstacles from the predefined map 512. In other words, the reference regions represent obstacles whose existence and position are known with a high degree of confidence.

In some examples, the selection of reference regions is limited to those regions within a threshold distance of any unobservable occupied regions. Limiting the selection of reference regions based on proximity to the unobservable occupied regions can reduce the computational burden associated with processing the unobservable occupied regions. For example, the processor 124 can be configured to select as reference regions only those voxels that are static or currently observed, and also within a threshold distance of any of the regions 616. The selection of reference regions can be further limited to only those voxels that are directly adjacent to unobservable occupied regions, and voxels that are separated from unobservable occupied regions only by empty space.

Figure 7:
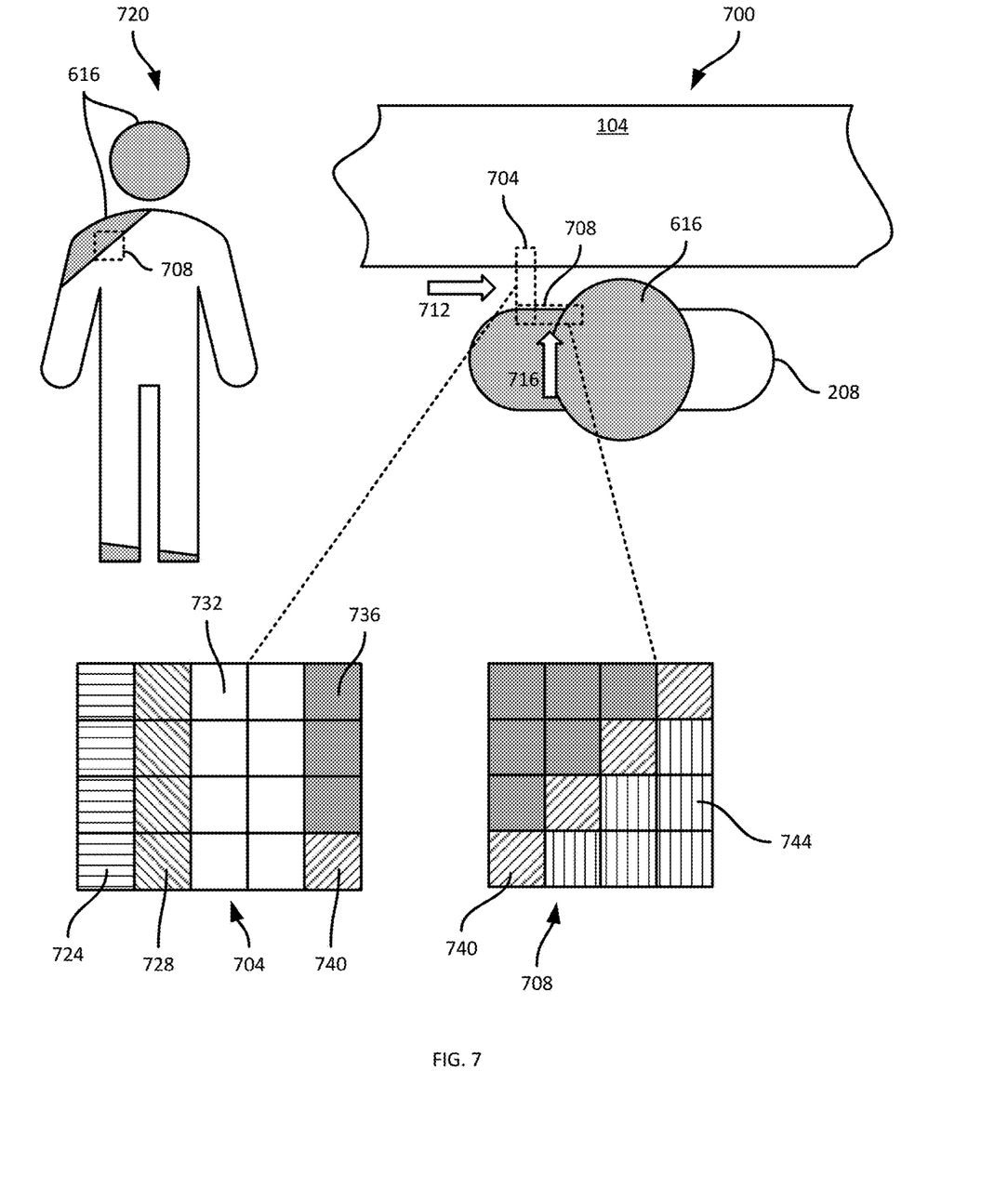
FIG. 7 is a diagram illustrating an example performance of block 420 of the method of FIG. 4.

Turning to FIG. 7, an example process for selecting reference regions at block 420 is illustrated. In particular, a portion 700 of the map 600 is shown, in an overhead orientation rather than the side orientation of FIG. 6. In the portion 700, two sets 704 and 708 of voxels are highlighted. Each set 704 and 708 has a depth of one voxel, and is shown in detail in the lower half of FIG. 7, as viewed from the corresponding directions 712 and 716. For clarity, the position of the set 708 is also shown in a side view 720.

The set 704 includes voxels 724 and 728 corresponding to the shelf module 104, voxels 732 representing empty space, unobservable occupied voxels 736 corresponding to a previously-observed portion of the person 208, as well as a voxel 740 representing a currently observed portion of the person 208 (i.e., labelled as a dynamic obstacle). The voxels 724, 728, and 740 are reference voxels, but need not all be selected at block 420. Instead, as noted above, the processor 124 is configured to select only the reference voxels directly adjacent to the unobservable occupied voxels 736 or separated from the unobservable occupied voxels 736 by only empty space. The processor 124 therefore selects the voxels 728 and 740 from the set 704.

The set 708, meanwhile, includes voxels 740 (mentioned above) and 744 corresponding to the currently observed portion of the person 208, as well as unobservable occupied voxels 736. By the same logic as set out above, the processor 124 selects the voxels 740 from the set 708 at block 420. As will now be apparent, the processor 124 can also select a variety of additional voxels from the map 600, according to the same criteria mentioned above.

In other examples, e.g., in which the map 600 includes coordinates or other attributes of segmented obstacles rather than an occupancy grid, the selection of reference regions at block 420 can include selecting any segmented obstacles that are currently observed or in the map 512, based on proximity of surfaces of such obstacles to the unobservable occupied regions.

At block 425, having selected reference regions at block 420 the processor 124 is configured to generate, for each unobservable occupied region (e.g., each unobservable occupied voxel 736), at least one connection score. More specifically, the processor 124 is configured to generate a distinct connection score for each reference identifier, according to the selected reference regions from block 420. In this example, therefore, the processor 124 is configured to generate two connection scores for each unobservable occupied voxel 736—a first score corresponding to the static-labelled reference regions, and a second score corresponding to the dynamic-labelled reference regions.

The connection scores generated for a given unobservable region at block 425 associate that unobservable region with the corresponding reference identifier. In particular, a connection score indicates a strength of association between the relevant unobservable region and the corresponding reference identifier. A stronger association (e.g., a higher connection score) indicates that the unobservable region is more likely to be physically connected with an object having the reference identifier. Based on the resulting connection score(s) for a given unobservable occupied region, and on the originally assigned reference identifier for that region from block 410, the processor 124 can then determine whether to maintain the occupied status of the region.

In this example performance, in which the obstacle map is an occupancy grid, the connection scores can be determined for each voxel at block 425 based on a flood fill operation. For example, beginning from the selected reference regions from block 420, the processor 124 can apply a score component to any adjacent unobservable occupied regions. For example, the processor 124 can be configured to apply a fraction (e.g., 80%, although a wide variety of other fractions are also contemplated) of a connection score of the selected reference region itself, to any adjacent unobservable occupied region. Reference regions are assigned maximal connection scores (e.g., 100% or any other suitable notation).

Figure 8:
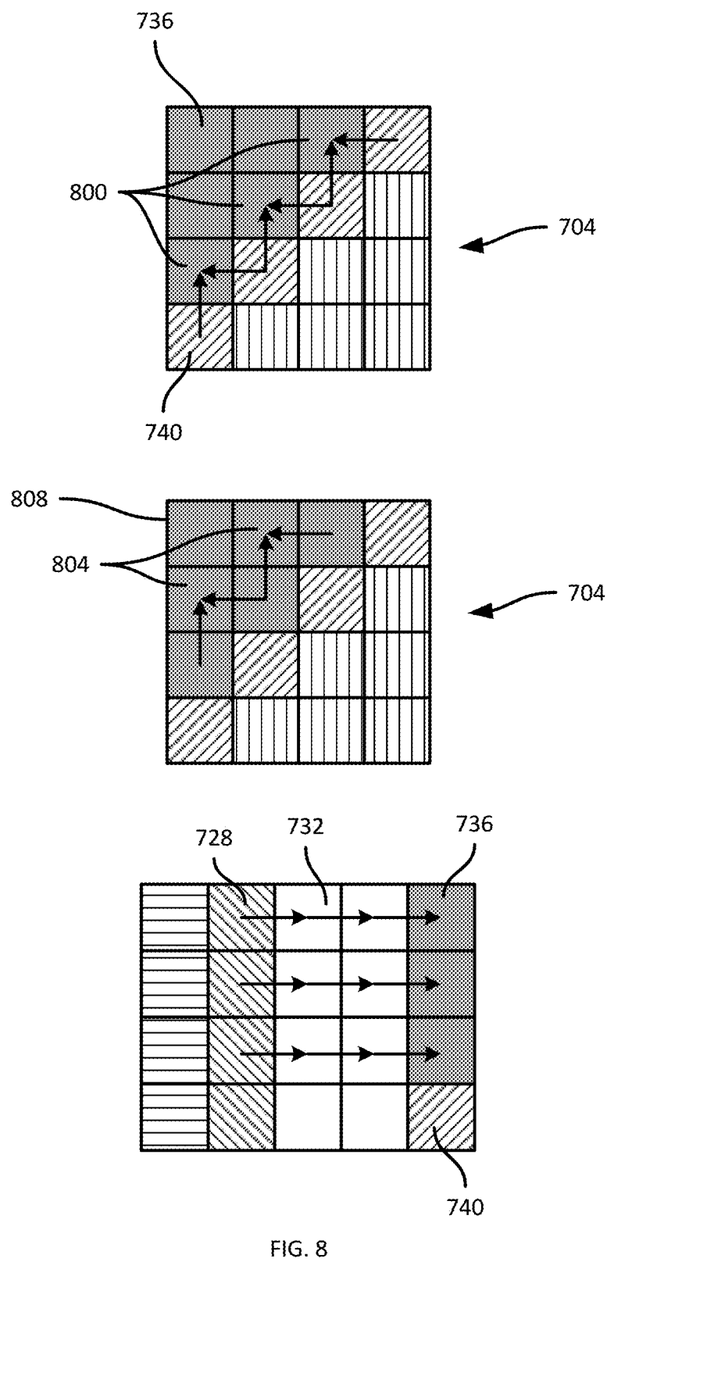
FIG. 8 is a diagram illustrating an example performance of block 425 of the method of FIG. 4.

Turning to FIG. 8, the sets 704 and 708 of voxels illustrated in FIG. 7 are shown during certain stages of the above-mentioned flood fill operation. In particular, as shown in the upper portion of FIG. 8, each selected reference region 740 that shares a side with an unobservable occupied region 736 contributes 80% of its own connection score to that unobservable region 736. Therefore, the unobservable occupied regions 800 each receive two contributions of 80%, as they each abut two distinct reference regions 740. When, as in this example, connection scores are limited to a maximum value (e.g., 100%), the scores for the voxels 800 are therefore set to 100%. In other examples it is not necessary to set an upper limit, however. Further, the voxels 800 are assigned the reference identifier "D", corresponding to the reference identifier of the selected voxels 740.

As shown in the middle portion of FIG. 8, the flood fill operation continues by selecting the next "unfilled" voxels, in this case a subset 804 of the unobservable occupied voxels 736 that are adjacent to the voxels 800 already processed as discussed above. The subset 804 of voxels are filled as described above, with the voxels 800 acting as seed voxels. As will now be apparent, the subset 804 of voxels also each receive connection scores of 100% and the dynamic reference identifier, as does the final voxel 808 in the set 704.

Turning to the set 708, shown in the lower third of FIG. 8, the selected reference voxels 728 are separated from the unobservable occupied voxels 736 by the empty voxels. When flood-filling to empty voxels rather than occupied voxels, the fraction contributed to the empty voxels may be lower than the fraction contributed to occupied voxels. For example, the selected reference voxels 728 can contribute 50% (rather than 80% as above; again, a wide variety of other fractions can be employed in other embodiments) of their connection scores to adjacent empty voxels. Thus, in three filling steps, the unobservable occupied voxels 736 receive a contribution of 20% from corresponding reference voxels 728. Specifically, the first adjacent empty voxel 732 receives 50%, and the next adjacent empty voxel 732 receives 25% (50% of the 50% assigned to the first empty voxel 732). The unobservable occupied voxel then receives 80% of 25%, i.e., 20%. Therefore, each of the three unobservable occupied voxels 736 illustrated receives a connection score of 20% associated with the static reference identifier, in addition to the previously-mentioned connection score of 80% associated with the dynamic reference identifier. The above process is repeated for every other unobservable occupied region in the map.

In other implementations, the generation of connection scores need not be performed via a flood fill operation as set out above. For example, a connection score for a given unobservable occupied region or set of unobservable occupied regions can be generated based on a computed distance between that unobservable occupied region and one or more reference regions (e.g., a center of mass of the reference regions). Such scores can be modified according to the presence of absence of empty space between the reference and unobservable regions.

Having generated connection scores for each unobservable occupied region, the processor 124 is configured to complete the performance of block 425 by selecting a current reference identifier for each unobservable occupied region. Specifically, the current reference identifier is the reference identifier associated with the highest connection score from those generated at block 425. In the example of FIG. 8, therefore, the dynamic reference identifier is selected for the unobservable occupied regions 736.

The processor 124 is then configured to select a handling action for each unobservable occupied region, based on the connection scores and selected reference identifiers from block 425, and on the historical reference identifiers originally selected for the now-unobservable regions. The handling actions include, for example, maintaining an occupied status and current reference identifier for an unobservable region, or clearing the unobservable occupied region, i.e., discarding its reference identifier and marking the region as empty space.

At block 430, the processor 124 is configured to determine whether the reference identifier selected at block 425 for each unobservable occupied region is different from the originally-assigned reference identifier when that region was detected at block 410 (i.e., when the region was observable). When the determination at block 430 is affirmative, indicating that the current reference identifier does not match the original reference identifier, the processor 124 proceeds to block 440. At block 440, the processor 124 is configured to clear the unobservable occupied region, marking it as empty space.

In the present example, however, the determination at block 430 is negative, because the dynamic reference identifier was assigned to the unobservable occupied voxels 736. The unobservable occupied voxels 736 were also originally assigned the dynamic reference identifier (given that they represented portions of the person 208), and the initial and current reference identifiers therefore match.

In response to a negative determination at block 430, the processor 124 is configured to proceed to block 435. At block 435, the processor 124 is configured to determine whether the connection score associated with the selected current reference identifier from block 425 exceeds a threshold. The threshold at block 435 is selected (e.g., at deployment of the apparatus 100) such that a connection score meeting the threshold is likely to indicate a true physical connection between an object in an unobservable region and an observed object. The threshold may be, in the present example, 15% (although a wide variety of other thresholds may also be employed). As seen from the discussion of FIG. 8, therefore, the determination at block 435 is affirmative in this example performance, for each of the unobservable occupied regions 736.

A negative determination at block 430, and an affirmative determination at block 435, therefore indicates that a connection detected between the unobservable occupied regions and the still-observable portions of an obstacle of the same category initially assigned to those unobservable occupied regions, is sufficiently strong to conclude that the obstacle has remained in substantially the same position, and that its now-unobservable portions are therefore likely to remain in their previously observed positions. The processor 124 therefore, at block 445, maintains the current reference identifier (which matches the initial reference identifier) in association with the unobservable occupied regions. That is, the unobservable occupied regions are maintained as occupied regions, with the same category of obstacle as initially assigned to them. In other examples, the determinations at blocks 430 and 435 can be performed in the opposite order than shown in FIG. 4.

Following block 445, the processor 124 proceeds to block 450. The dashed line returning from block 445 to block 425 indicates that the above process is repeated for each unobservable occupied region, although such repetition need not be performed in sequence. Instead, as noted above in connection with the flood fill operations, all the unobservable occupied regions can be processed together.

At block 450, the processor 124 is configured to control the locomotive assembly 116 according to the updated obstacle map resulting from the performance of blocks 410 through 445. For example, the processor 124 can issue a command to the locomotive assembly 116 to pause forward movement of the apparatus 100, until the person 208 moves out of the path of the apparatus 100. The processor 124 then returns to block 405.

Figure 9:
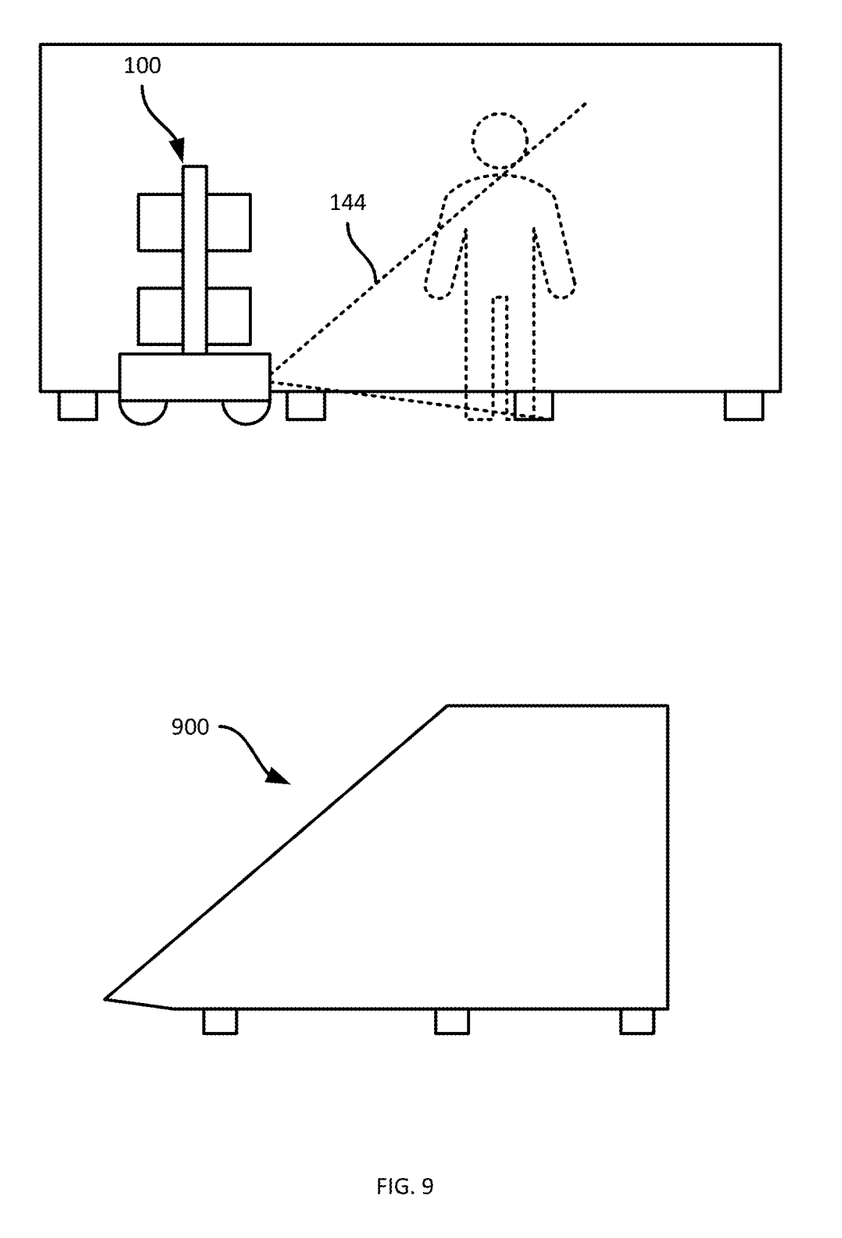
FIG. 9 is a diagram illustrating the results of a further example performance of the method of FIG. 4.

In a further example performance of the method 400, it is assumed that the person 208 has moved out of the FOV 144 of the sensor 140, as shown in FIG. 3. The obstacle map obtained at block 410 therefore appears as the map 304 in FIG. 3, in which the observable regions previously containing portions of the person 208 have been cleared, but the unobservable occupied regions 308 remain. As will now be apparent, a subsequent performance of block 420 results in the selection of only reference regions corresponding to the shelf module 104, because there are no longer any observable dynamic regions in the map from block 410. The voxels defining the unobservable occupied regions 308 are therefore each assigned connection scores as described above, only for the static reference identifier. Put another way, the connection scores corresponding to the dynamic reference identifier for such voxels are zero. At block 425, the static reference identifier is therefore selected for the unobservable occupied regions 308. The determination at block 430 is therefore affirmative, because those regions were previously assigned the dynamic reference identifier. The regions 308 are therefore cleared at block 440, resulting in an updated map 900, shown in FIG. 9. The updated map 900 indicates the presence of only the shelf module 104. At a further performance of block 450, therefore, the apparatus 100 may proceed along the shelf module 104.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

Certain expressions may be employed herein to list combinations of elements. Examples of such expressions include: "at least one of A, B, and C"; "one or more of A, B, and C"; "at least one of A, B, or C"; "one or more of A, B, or C". Unless expressly indicated otherwise, the above expressions encompass any combination of A and/or B and/or C.

It will be appreciated that some embodiments may be comprised of one or more specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A method, comprising:
   maintaining a map of occupied regions of a facility;
   controlling a navigational sensor of a mobile apparatus to capture sensor data within a sensor field of view (FOV);
   based on a current location of the mobile apparatus in the facility, identifying an unobservable occupied region, located outside the sensor FOV, in the map;
   selecting, from the map, a first reference occupied region having a first reference identifier, and a second reference occupied region having a second reference identifier;
   generating a first connection score associating the unobservable occupied region with the first reference occupied region, and a second connection score associating the unobservable occupied region with the second reference occupied region;
   selecting a handling operation for the unobservable occupied region, based on the first and second connection scores;
   updating the map according to the selected handling operation; and
   controlling a locomotive assembly of the mobile apparatus according to the updated map.

2. The method of claim 1, further comprising:
   processing the captured sensor data to detect an observed occupied region located in the sensor FOV; and
   updating the map according to the observed occupied region;
   wherein the first reference occupied region includes the observed occupied region.

3. The method of claim 2, wherein the map includes a static occupied region; and
   wherein the second reference occupied region includes the static occupied region.

4. The method of claim 2, wherein the first and second reference identifiers are respective obstacle identifiers.

5. The method of claim 2, wherein the first and second reference identifiers are respective obstacle categories.

6. The method of claim 5, further comprising:
   responsive to detecting the observed occupied region, assigning an obstacle category to the observed occupied region based on a comparison of the observed occupied region to a set of predefined static obstacles.

7. The method of claim 1, wherein generating the first and second connection scores is based on at least:
   (i) proximity between the reference occupied region, and
   (ii) presence of unoccupied regions separating the reference occupied region from the unobservable occupied region.

8. The method of claim 1, wherein selecting the first and second reference occupied regions includes selecting occupied regions in the map within a threshold distance of the unobservable occupied region.

9. The method of claim 1, wherein selecting the handling operation for the unobservable occupied region includes:
   determining that neither of the first and second connection score exceeds a threshold; and
   clearing the unobservable occupied region in the map.

10. The method of claim 1, wherein selecting the handling operation for the unobservable occupied region includes:
    selecting the greater of the first and second connection scores; and
    associating the corresponding reference identifier with the unobservable occupied region.

11. The method of claim 10, wherein selecting the handling operation for the unobservable occupied region includes:
    comparing the corresponding reference ID with a previous reference ID associated with the unobservable occupied region; and
    when the corresponding and previous reference IDs are different, clearing the unobservable occupied region in the map.

12. The method of claim 1, wherein mobile apparatus includes:
    a chassis base supporting the locomotive assembly and the sensor; and
    a rack extending from the chassis to support one or more receptacles.

13. A computing device, comprising:
    a sensor having a sensor field of view (FOV); and
    a processor configured to:
       maintain a map of occupied regions of a facility;
       control the sensor to capture sensor data within a sensor field of view (FOV);
       based on a current location of a mobile apparatus in the facility, identify an unobservable occupied region, located outside the sensor FOV, in the map;
       select, from the map, a first reference occupied region having a first reference identifier, and a second reference occupied region having a second reference identifier;
       generate a first connection score associating the unobservable occupied region with the first reference occupied region, and a second connection score associating the unobservable occupied region with the second reference occupied region;
       select a handling operation for the unobservable occupied region, based on the first and second connection scores;
       update the map according to the selected handling operation; and
       control a locomotive assembly of the mobile apparatus according to the updated map.

14. The method of claim 13, wherein the processor is further configured to:
    process the captured sensor data to detect an observed occupied region located in the sensor FOV; and
    update the map according to the observed occupied region;
    wherein the first reference occupied region includes the observed occupied region.

15. The computing device of claim 13, wherein the map includes a static occupied region; and
    wherein the second reference occupied region includes the static occupied region.

16. The computing device of claim 13, wherein the first and second reference identifiers are respective obstacle identifiers.

17. The computing device of claim 13, wherein the first and second reference identifiers are respective obstacle categories.

18. The computing device of claim 17, wherein the processor is further configured to:

responsive to detecting the observed occupied region, assign an obstacle category to the observed occupied region based on a comparison of the observed occupied region to a set of predefined static obstacles.

19. The computing device of claim 13, wherein the processor is configured to generate the first and second connection scores based on at least:
   (i) proximity between the reference occupied region, and
   (ii) presence of unoccupied regions separating the reference occupied region from the unobservable occupied region.

20. The computing device of claim 13, wherein the processor is configured to select the first and second reference occupied regions by: selecting occupied regions in the map within a threshold distance of the unobservable occupied region.

21. The computing device of claim 13, wherein the processor is configured to select the handling operation for the unobservable occupied region by:
   determining that neither of the first and second connection score exceeds a threshold; and
   clearing the unobservable occupied region in the map.

22. The computing device of claim 13, wherein the processor is configured to select the handling operation for the unobservable occupied region by:
   selecting the greater of the first and second connection scores; and
   associating the corresponding reference identifier with the unobservable occupied region.

23. The computing device of claim 21, wherein the processor is configured to select the handling operation for the unobservable occupied region by:
   comparing the corresponding reference ID with a previous reference ID associated with the unobservable occupied region; and
   when the corresponding and previous reference IDs are different, clearing the unobservable occupied region in the map.

24. The computing device of claim 13, wherein mobile apparatus includes:
   a chassis base supporting the locomotive assembly and the sensor; and
   a rack extending from the chassis to support one or more receptacles.

\* \* \* \* \*